United States Patent [19]
Ozawa

[11] Patent Number: 5,201,686
[45] Date of Patent: Apr. 13, 1993

[54] PROCESS AND APPARATUS FOR PRODUCING A LOCK NUT

[76] Inventor: Kunihiko Ozawa, 39-6 Tsurukawa 4-chome, Machida-shi, Tokyo, Japan

[21] Appl. No.: 789,813

[22] Filed: Nov. 12, 1991

Related U.S. Application Data

[63] Continuation-in-part of Ser. No. 574,158, Aug. 27, 1990, abandoned.

[51] Int. Cl.$^5$ ............................................. B21D 53/24
[52] U.S. Cl. ......................................... 470/19; 470/95; 470/109; 470/179; 470/165; 470/47; 72/426; 72/361
[58] Field of Search .................. 470/19, 18, 95, 89, 470/109, 179, 180, 165, 167, 166, 902, 907, 47, 25, 26; 72/428, 419, 424, 426, 361

[56] References Cited
U.S. PATENT DOCUMENTS

| | | | |
|---|---|---|---|
| 1,219,803 | 3/1917 | Brightman | 470/167 |
| 1,762,192 | 6/1930 | Peirce | 470/167 |
| 2,156,822 | 5/1939 | Smith | 470/180 |
| 2,217,715 | 10/1940 | Swanstrom | 470/109 |
| 3,628,368 | 12/1971 | Cvacho et al. | 72/424 |
| 3,657,403 | 4/1972 | Eade et al. | 470/179 |
| 4,534,202 | 8/1985 | Snyder | 72/428 |

Primary Examiner—Lowell A. Larson
Assistant Examiner—Michael J. McKeon
Attorney, Agent, or Firm—Jacobson, Price, Holman & Stern

[57] ABSTRACT

In production of a lock nut used for fastening in cooperation with a bolt, a tubular material of a polygonal transverse cross section is machined into a crude block integrally made up of an angled main body and a truncated cone having a common, circular cente hole which is then tapped, a series of crude blocks are periodically and intermittently supplied to and registered at a shaping center provided on a holder assembly, each crude block is compressed with a compression mould to deform its tapped hole into a polygonal transverse cross section in the region of its truncated cone, and a lock nut thus produced are delivered out of the shaping center after compression. The process is fully automatized and the deformed transverse cross section of the rapped hole assures halmless, elastic, blanced fastening on a bolt in screw engagement of the lock nut.

9 Claims, 4 Drawing Sheets

PROCESS AND APPARATUS FOR PRODUCING A LOCK NUT

This is a continuation-in-part application of a co-pending U.S. Patent Application Ser. No. 574,158 filed on Aug. 27, 1990 and now abandoned.

BACKGROUND OF THE INVENTION

The present invention relates to an automatic process and apparatus for producing a lock nut, and more particularly relates to automatization in production of a lock nut used for fastening purposes in cooperation with a bolt.

In the conventional production system of such a lock nut, a tubular material of a hexagonal transverse cross section is machined to form a block which is made up of a main body of the ordinary nut configuration and a truncated cone axially integral with one end of the main body. The main body and the truncated cone have a common through, axial center hole. Next, a plurality of, for example six, radial slits are formed at equal center angle intervals in the wall of the center hole in the region of the truncated cone. Then, the center hole is machined by, for example, a thread grinder to form it into a tapped hole. Finally, the truncated cone of the block is mechanically squeezed inwards by compressing in the axial direction with a mould having a truncated, conical recess. This compression minimized the diameter of the tapped hole in the region of the truncated cone in obtain an intended lock nut.

In the case of this conventional production system, presence of the slits formation step forms a serious neck in full automatization of the process, because the slit formation step requires a great deal of manual labour. Obviously, need for such manual labour causes undesirable increase in production cost. Presence of slit formation induces another problem in use of the lock nut. Formation of such slits develops sharp points at the squeezed end of each slit and the slits tend to damage the threaded surface of an associated bolt in screw engagement with the lock nut, thereby producing fine metallic chips. Presence of such fine metallic chips between the lock nut and the bolt are liable to cause serious seizure in the screw engagement.

In addition to the problem of damage on an associated bolt, it is also important in design of a lock nut to assure reliable fastening on the bolt. In order to suffice this requirement, it is necessary to provide the lock nut with an elastic construction which applies elastic fastening on the bolt in screw engagement with the lock nut. No special consideration is paid in this regard in production of lock nuts.

SUMMARY OF THE INVENTION

It is, therefore, the primary object of the present invention to enable full automatization in production of lock nuts.

It is another object of the present invention to produce a lock nut which assures reliable fastening on a cooperating bolt without any danger of seizure at screw engagement.

In accordance with the basic concept of the present invention, a tubular material of a polygonal transverse cross section is machined into a crude block made up of a main body and a truncated cone and having a common circular, center hole which is then tapped, a series of crude blocks are periodically supplied and registered at a shaping center provided on a holder assembly, each registered crude block is compressed with a mould to deform its tapped hole into a polygonal transverse cross section in the region of the truncated cone, and lock nuts thus obtained are intermittently and sequentially delivered out of the shaping center after compression.

DESCRIPTION OF PREFERRED EMBODIMENTS

The present invention is well applicable to production of a lock nut of any polygonal transverse cross sectional profile. For the purpose of simplification, however, the following descriptions are directed to production of a lock nut of a hexagonal transverse cross sectional profile. In practice, the transverse cross section of a lock nut to be produced in accordance with the present invention is at least hexagonal.

Figure 1A:
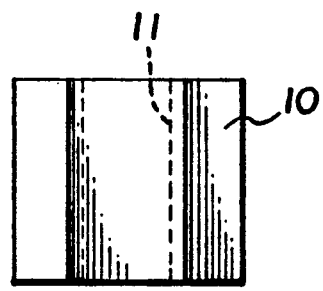
FIGS. 1A and 1B are side and plan views of the tubular material used as a starting material for production in accordance with the present invention.
Figure 1B:
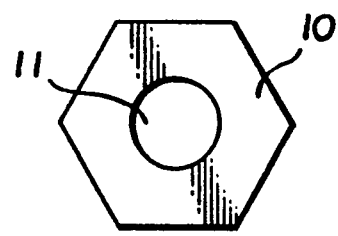

The process in accordance with the present invention starts, as in the conventional process, with preparation of a tubular body 10 of a hexagonal transverse cross section such as shown in FIGS. 1A and 1B. This tubular body 10 has a circular center hole 11.

Figure 2A:
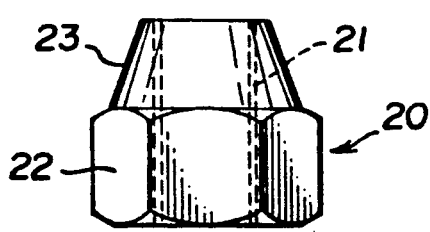
FIGS. 2A and 2B are side and plan views of the crude block obtained as an intermediate product in the process of the present invention.
Figure 2B:
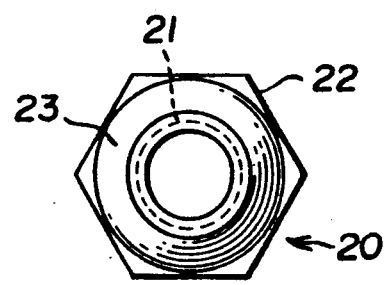

This tubular material 10 is machined into a crude block such as shown in FIGS. 2A and 2B. This crude block 20 is made up of a main body 22 of an ordinary nut configuration and a truncated cone 23 axially integral with one end of the main body 22. After the machining, the center hole 11 is worked by, for example, a thread grinder to form a tapped hole 21 which extends through the main body 22 and the truncated cone 23. Alternatively, the tapped hole 21 may be formed into the tubular material 10 before machining.

Figure 3A:
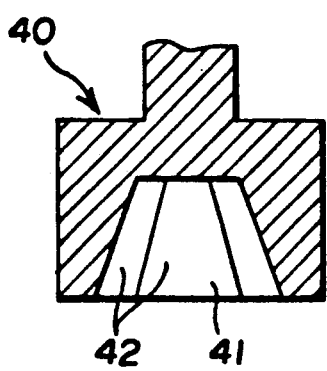
FIGS. 3A and 3B are sectional side and bottom views of a mould used for the process of the present invention.
Figure 3B:
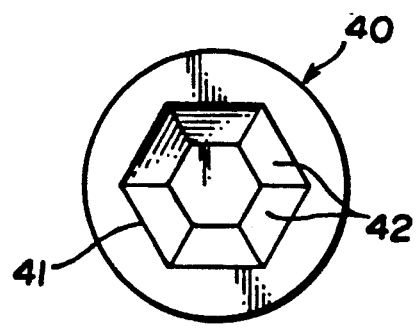

Next, the crude block 20 is subjected to mechanical compression of its truncated cone 23. As shown in FIGS. 3A and 3B, this mould 40 is provided with a shaping recess 41 given in the form of a hexagonal, truncated pyramid defined by six circumferentially juxtaposed slants 42. More generally, the shaping recess 41 is given in the form of a polygonal, truncated pyramid defined by, preferably, six or more circumferentially juxtaposed slants 42.

Figure 4:
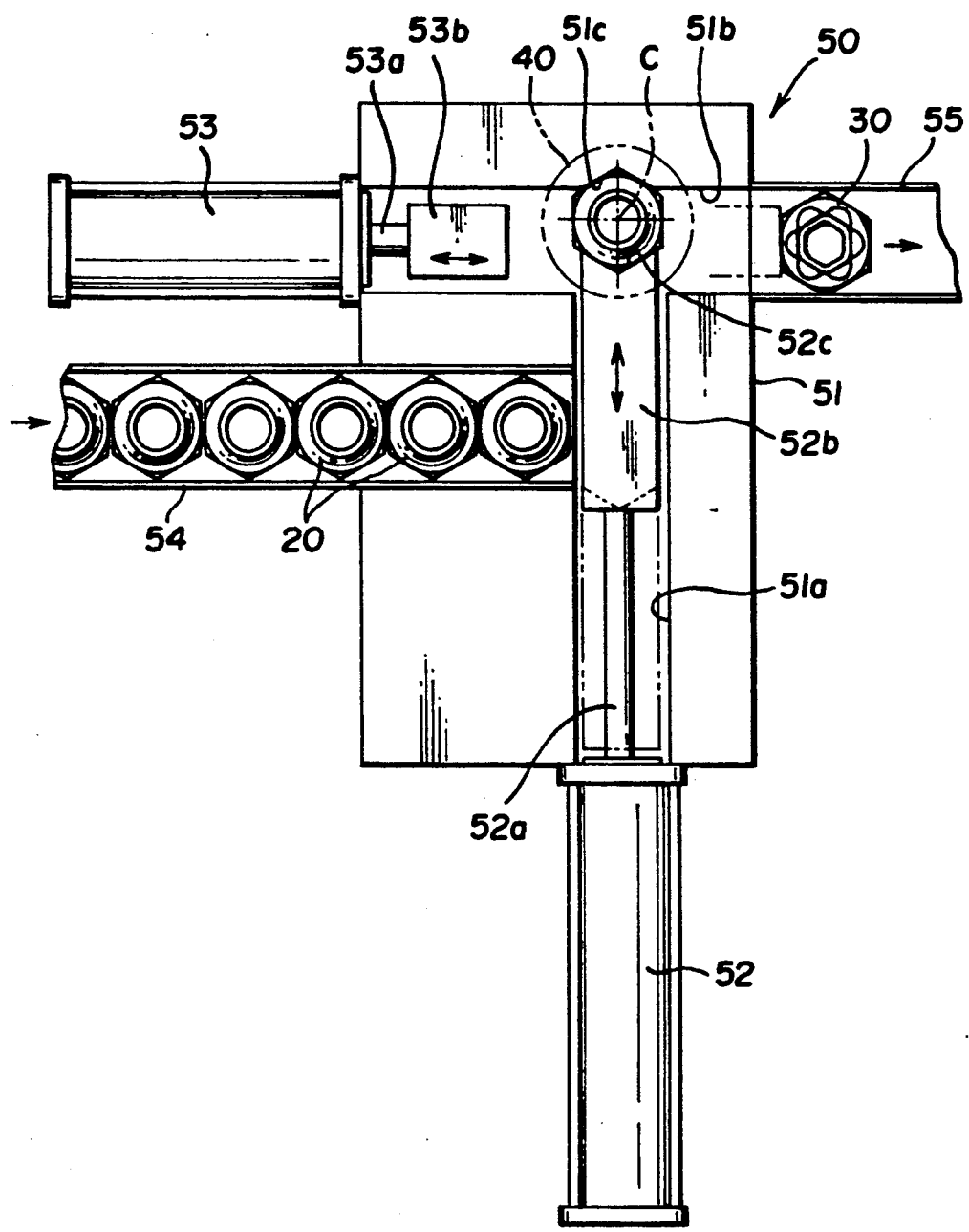
FIG. 4 is a plan view of one embodiment of the apparatus in accordance with the present invention.

The mechanical compression is carried out on a holder assembly one embodiment of which is shown in FIG. 4. The holder assembly 50 includes a horizontal table 51 accompanied with a supply chute 54 for crude block 20, a delivery chute 55 for lock nuts 30, and a shaping center C located intermediately of the downstream end of the supply chute 54 and the upstream end of the delivery chute 55. The horizontal table 51 is provided with the first and second guide paths 51a, 51b defined therein.

The first guide path 51a runs leading to the shaping center C and the downstream end of the supply chute 54 opens in one side wall of this guide path 51a. This guide path 51a is associated with the first pneumatic unit 52 which is mounted to the table 51 and connected to a given pneumatic source not shown. The pneumatic unit 52 has a piston rod 52a which extends in the guide path 51a and carries at its front end a plunger 52b. The plunger 52b is provided, in its end facing the shaping center C, with an angled seat 52c which is adapted for engagement with a crude block 20 as later described in more detail.

The second guide path 51b runs past the shaping center C and terminates at the upstream end of the delivery chute 55. Thus, the first and second guide paths 51a, 51b meets together at the shaping center C. In the case of the illustrated example, they cross substantially at a right angle. This guide path 51b is also associated with the second pneumatic unit 53 which is mounted to the table 51 in communication with a given pneumatic source not shown. The pneumatic unit 53 has piston rod 53a which extends in the guide path 51b and carries at its front end a plunger 53b. At the location of the shaping center C, the second guide path 51b is provided, in its side wall opposed to the opening of the first guide path 51a, with an angled recess 51c which is adapted for engagement with a crude block 20 registered at the shaping center C as described later in more detail.

The above-described mould 40 is arranged above the shaping center C with its shaping recess 41 opening downwards. This mould 40 is shown with a two-dot chain line in the illustration and accompanied with a proper drive unit (not shown) for causing its vertical reciprocation for compression purposes.

In operation, the crude blocks 20 are supplied one after another along the supply chute 54 intermittently and periodically into the first guide path 51a. On entry of one crude block 20 into the first guide path 51a, the piston rod 52a of the first pneumatic unit 52 projects to advance its plunger 52b. Then, the crude block 20 comes into engagement with the angled seat 52c of the plunger 52b which then moves the crude block 20 towards the shaping center C. By further advance of the plunger 52b, the crude block 20 is brought into engagement with the angled recess 51c for correct registration at the shaping center C. After complete registration, the piston rod 52a recedes to pull back its plunger 52b to its initial position for the next cycle of same operation.

Next, the overhead mould 40 is driven for downward movement to axially compress the truncated cone 23 of the crude block 20 at the shaping center C. During this compression, the position of the crude block 20 is kept unmoved thanks to its engagement with the angled recess 51c in the side wall of the second guide path 51b. After complete compression, the mould 40 is driven for upward movement to its initial position for the next cycle of same compression. A lock nut 30 is now produced.

Then, the second pneumatic unit 53 is activated to project its piston rod 53a and the plunger 53b advances to push the lock nut 30 out of the shaping center towards the delivery chute 55.

Figure 6A:
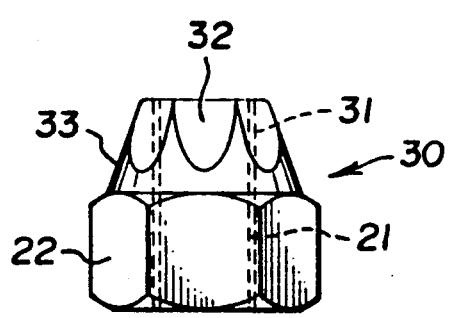
FIGS. 6A and 6B are side and plan views of one example of the lock nut produced in accordance with the present invention.
Figure 6B:
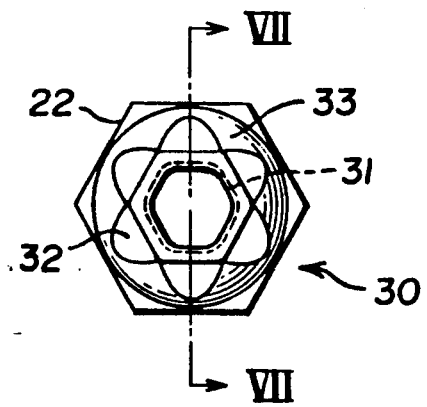
Figure 7:
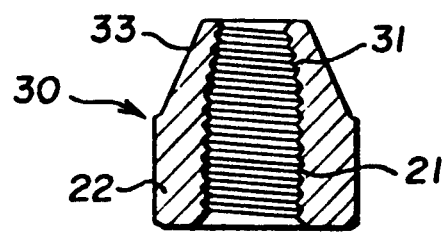
FIG. 7 is a section taken along a line VII—VII in FIG. 6B.

One example of the lock nut thus produced is shown in FIGS. 6A, 6B and 7. This lock nut 30 includes a main body 22 having the original tapped hole 21 and a squeezed section 33 deformed by compression from the truncated cone 23 on the crude block 20. The squeezed section 33 is provided externally with six chamfers 32 diverging towards the main body 22. The squeezed section 33 is further provided internally with a deformed tapped hole 31 in axial communication with the tapped hole 21 in the main body 22. As shown in FIG. 6B, the deformed tapped hole 31 is provided with a hexagonal transverse cross section. More generally, the deformed tapped hole 31 is provided with a polygonal transverse cross section whereas the tapped hole 21 is provided with an original circular transverse cross section.

In accordance with the present invention, the process is fully automatized thanks to removal of the conventional slit formation. No presence of sharp points in the tapped hole of the lock nut avoids the danger of seizure in screw engagement with a cooperating bolt.

In addition, the polygonal transverse cross section of the deformed tapped hole assures ideal fastening effect on the bolt. When combined with the bolt, the lock nut comes into frictional contact with the bolt at several devised sections in the region of the deformed tapped hole 31. Such a divisional frictional contact of the lock nut with the bolt well dissipates the fastening force and, as a consequence, results in remarkably reduced damage on the bolt even aside from the problem of the radial slits. Application of fastening force to the bolt from several sides on the lock bolt establishes balanced elastic fastening which can endure vibrations in use without the danger of accidental loosening.

Figure 5:
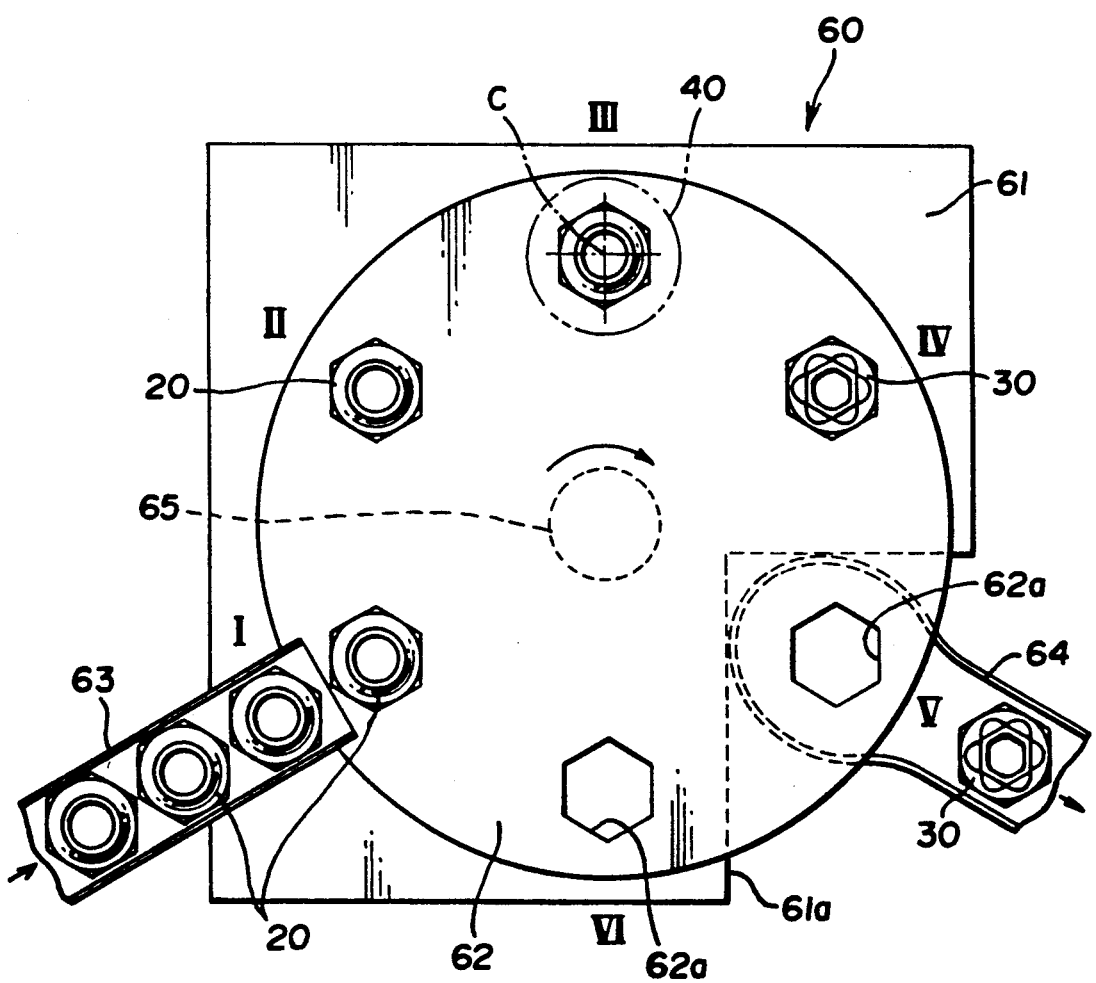
FIG. 5 is a plan view of another embodiment of the apparatus in accordance with the present invention.

Another embodiment of the apparatus in accordance with the present invention is shown in FIG. 5, in which a rotary disc is used for periodical, intermittent supply of crude blocks. More specifically, a holder assembly 60 includes a horizontal table 61 having a center shaft 65 and a corner cutout 61a. A circular disc 62 is mounted to the center shaft 65 over the table 61. The disc 62 is provided in its upper face with six bottomless, open seats 62a arranged at equal center angle intervals. In the case of the illustrated example, each open seat 62a is hexagonal in transverse cross sectional profile for acceptance of one hexagonal crude block 20. Obviously, the shape of the open seat 62 varies depending on the transverse cross sectional profile of the crude block 20. The disc 62 is driven, by a proper drive source not shown, for intermittent rotation about the center shaft 65 so that the six open seats 62a stops at six different stations I to VI set on the table 61 circumferentially around the disc 62. In the case of the illustrated example, the first station I is for supply of the crude blocks 20 and the fifth station V is taken in the area of the corner cutout 61a in the table 61 for delivery of lock nuts 30. The downstream end of a supply chute 63 is located at the first station I opening over the top face of the disc 62, the upstream end of a delivery chute 64 is located at the fifth station V opening under the bottom face of the disc 62, and the shaping center C is taken at the third station III.

In operation, crude blocks 20 are periodically supplied along the supply chute 63 and received in one open seat 62a in the disc 62 at the first station I. By intermittent rotation of the disc 62, each crude block 20 is transferred, past the second station II, to the third station III, whereat mechanical compression is applied to the crude block 20 by the mould 40 just as in the case of the first embodiment shown in FIG. 4. Each lock nut 30 thus produced is brought, past the fourth station IV, to the fifth station V by further intermittent rotation of the disc 62. Upon arrival at the fifth station V, the lock nut 30 falls on the delivery chute 64 off the open seat 62a due to its own weight.

In a preferred embodiment of the present invention, monitoring of the result of compression can be carried out additionally. The crude blocks 20 are inevitably accompanied with variation in axial length and such variation in axial length leads to corresponding variation in extent of axial compression by the mould 40. In accordance with the present invention, the diameter of the deformed tapped hole 31 in each lock nut 30 (see FIG. 7) is monitored as an index of such a variation in compression. When the diameter of the deformed tapped hole 31 in a produced lock nut 30 exceeds a certain threshold value, the lock nut 30 is again subjected to supplementary compression of a slightly deeper extent.

Such monitoring and supplementary compression are most conveniently and efficiently carried out on the holder assembly 60 shown in FIG. 5. In this case, the fourth station IV is reserved for the monitoring of the hole diameter, the fifth station for the supplementary compression, and the sixth station VI for delivery of lock nuts 30. After the primary compression at the third station III, the hole diameter is monitored at the fourth station IV. When the result of the monitoring is affirmative, the lock nut 30 is passed to the delivery station VI without the supplementary compression. Whereas, when the result of the monitoring is negative, the lock nut 30 is passed to the delivery station VI after the supplementary compression at the fifth station V. Such selective, alternative operations are controlled in a known manner by a central processing unit associated with the apparatus of the present invention.

Such monitoring and supplementary compression can be carried out on the holder assembly 50 shown in FIG. 4 too by adding some extension to the downstream end of the second guide path 51b. In this case, an angled recess such as the one 51c shown in FIG. 4 is provided at the supplementary shaping center for correct positioning of a lock nut which has undergone the primary compression.

Alternatively, supplemental compression may be carried out not in direct succession to the primary compression but separately on a separate apparatus.

In connection with this suppremental compression, it should be noted that no matching between a particular corner of a crude block (or primarily compressed lock nut) and a particular corner (in the shaping recesses) of a mould is required. What is required is matching between a corner of a crude block (or a primarily compressed lock nut) and a corner (in the shaping recess) of a mould. Thus, during transportation from the primary compression to the supplementary compression, a primarily compressed lock nut is allowed to undergo 60, 120, 180, 240 or 300 degree center angle rotation. When a primarily compressed lock nut has undergone other center angle rotations, the angular position is corrected to one of the 60, 120, 180, 240 and 300 degree center angle rotations through use of the angled recess 51c in the case of the embodiment shown in FIG. 4 and use of the open seats 62a in the case of the embodiment shown in FIG. 5, respectively.

In monitoring of the deformed tapped hole diameter, a detector rod of the standard diameter is manually or automatically inserted into the deformed tapped hole. When the real diameter of the deformed tapped hole is larger than the standard diameter of the detector rod, the associated primarily compressed lock nut is discharged off the line as being condemnable. Any real diameters of the deformed tapped hole falling short of the standard diameter are acceptable in practice. The machining is carried out from bottom upwards to form the truncated cone 23 shown in FIG. 2. When the axial length of the tubular material 10 is larger than the standard, subsequent primary compression may make the deformed tapped hole diameter smaller than the standard. However, due to the reduced thickness of the wall section defining the deformed tapped hole, fastening poses no malign influence on a bolt to be screw engagement with the associated nut lock.

I claim:

1. An automatic process for producing a lock nut using a mould provided with a polygonal shaping recess and a holder assembly provided with a shaping center, said process comprising the sequential steps of machining a tubular material of a polygonal transverse cross section into a crude block made up of a main body of an ordinary nut configuration and a truncated cone axially integral with one end of said main body, both having a common, circular hole, forming said hole into a tapped hole, periodically and intermittently supplying a series of said crude blocks to said shaping center on said holder assembly, positioning each said crude block at said shaping center, compressing said crude block with said compression mould to provide said tapped hole with a polygonal transverse cross section in the region of said truncated cone, delivering a lock nut thus obtained off said shaping center after compression, monitoring the diameter of said tapped hole of said lock nut after delivery from said shaping center, and subjecting said lock nut to supplementary compression only when said diameter of said tapped hole exceeds a predetermined threshold value.

2. An automatic process as claimed in claim 1 in which
   said supplementary compression is deeper in extent than said first stated compression.

3. An automatic process as claimed in claim 1 in which
   said crude blocks are supplied along a first substantially linear path of travel leading to said shaping center, and
   said lock nuts are delivered along a second path of travel mating said first path of travel at said shaping center.

4. An automatic process as claimed in claim 1 in which
   said crude blocks are supplied along a first arcuate path of travel leading to said shaping center,
   said lock nuts are delivered along a second arcuate path of travel extending from said shaping center, and
   said first and second arcuate paths of travel form a continuous circular path of travel.

5. An automatic apparatus for producing a lock nut from a crude block comprising, in combination,
   a holder assembly including a horizontal table provided thereon with a shaping center, a compression mould positioned at said shaping center and provided with a truncated shaping recess of a polygonal transverse cross section for compression of the crude block and compressing means for pressing said mould against the crude block when the block is positioned at said shaping center to form the block into a lock nut, a supply chute for crude blocks attached to said table of said holder assembly, and a delivery chute for lock nuts attached to said table of said holder assembly, said holder assembly further including means for periodically and intermittently transferring said crude blocks from said supply chute to said shaping center and said lock nuts from said shaping center to said delivery chute, means, arranged adjacent said shaping center, for monitoring a dimension of said lock nut resulting from said compression by said compressing means; and means for selectively applying supplementary compression to said lock nut only when said dimension does not conform to a required dimension, in which said transferring means includes a first substantially linear guide path which is formed in said table in communication with said supply chute and leading to said shaping center, a first pneumatic unit including a piston plunger reciprocal in said first guide path, a second substantially linear guide path which is formed in said table in communication with said delivery chute and extending past said shaping center, and a second pneumatic unit including a piston plunger reciprocal in said second guide path.

6. An automatic apparatus as claimed in claim 5 in which said second guide path is provided at said shaping center with an angled recess which is engageble with said crude block and formed in its side wall opposite to the downstream end of said first guide path.

7. An automatic apparatus for producing a lock nut from a crude block comprising, in combination, a holder assembly including a horizontal table provided thereon with a shaping center, a compression mould positioned at said shaping center and provided with a truncated shaping recess of a polygonal transverse cross section for compression of the crude block and compressing means for pressing said mould against the crude block when the block is positioned at said shaping center to form the block into a lock nut, a supply chute for crude blocks attached to said table of said holder assembly, and a delivery chute for lock nuts attached to said table of said holder assembly, said holder assembly further including means for periodically and intermittently transferring said crude blocks from said supply chute to said shaping center and said lock nuts from said shaping center to said delivery chute, in which said transferring means includes a circular disc arranged on said table and provided with a plurality of bottomless, open seats which are arranged circumferentially at equal center angle intervals, each of said open seats being receptive of a crude block, and means for driving said disc for a periodical, intermittent rotation about its center, whereby said plurality of open seats stop sequentially at a plurality of stations arranged, at equal center angle intervals, along a circular path of travel, and said stations include at least a joint to said supply chute and a joint to said delivery chute and said shaping center, the apparatus further comprising means, arranged adjacent said shaping center, for monitoring a dimension of said lock nut resulting from said compression by said compressing means and means for selectively applying supplementary compression to said lock nut only when said dimension does not conform to a required dimension.

8. An automatic apparatus as claimed in claim 7 in which each said open seat conforms in transverse cross section to each said crude block.

9. An automatic apparatus as claimed in claim 7 in which said table is provided with a local cutout and said joint to said delivery chute is located within the region of said local cutout.

* * * * *